(12) United States Patent
Moore

(10) Patent No.: US 9,365,336 B2
(45) Date of Patent: Jun. 14, 2016

(54) TIE STRIP

(76) Inventor: Simon John Moore, Blackburn (GB)

( * ) Notice: Subject to any disclaimer, the term of this patent is extended or adjusted under 35 U.S.C. 154(b) by 713 days.

(21) Appl. No.: 13/261,674

(22) PCT Filed: Apr. 21, 2010

(86) PCT No.: PCT/GB2010/050650
§ 371 (c)(1),
(2), (4) Date: Oct. 24, 2011

(87) PCT Pub. No.: WO2010/122338
PCT Pub. Date: Oct. 28, 2010

(65) Prior Publication Data
US 2014/0020229 A1  Jan. 23, 2014

(30) Foreign Application Priority Data
Apr. 24, 2009  (GB) .................................. 0907082.2

(51) Int. Cl.
| B65D 63/00 | (2006.01) |
| B65D 67/02 | (2006.01) |
| B65D 63/10 | (2006.01) |
| F16L 3/233 | (2006.01) |
| B29C 53/28 | (2006.01) |

(52) U.S. Cl.
CPC ............ B65D 63/10 (2013.01); B65D 63/1018 (2013.01); B65D 63/1027 (2013.01); F16L 3/233 (2013.01); B29C 53/285 (2013.01); B29C 2793/0018 (2013.01); Y10T 24/1418 (2015.01); Y10T 29/49947 (2015.01)

(58) Field of Classification Search
CPC ......... H02G 1/08; G02B 6/4463; F16L 3/233; F16L 33/00; B65D 63/10; B65D 2313/02; B65D 63/14; B65D 85/182; B65D 63/00; B65D 67/02; A44B 18/00; A44B 15/055; A45C 11/182; A45C 11/321
USPC .......... 29/433, 525.01; 24/16 PB, 16 R, 17 A
See application file for complete search history.

(56) References Cited

U.S. PATENT DOCUMENTS

| 4,077,562 | A | * | 3/1978 | Ballin ............................. 383/71 |
| 4,510,649 | A | * | 4/1985 | Yudis et al. ................. 24/16 PB |
| 4,910,831 | A | * | 3/1990 | Bingold ....................... 24/16 PB |
| 5,088,158 | A | * | 2/1992 | Burkholder ................. 24/16 PB |
| 5,470,520 | A | * | 11/1995 | Sorensen et al. ........... 264/297.2 |
| 5,799,376 | A | * | 9/1998 | Harsley ....................... 24/16 PB |
| 5,921,510 | A | * | 7/1999 | Benoit et al. .................... 248/71 |
| 6,151,761 | A | * | 11/2000 | Thompson ................. 24/16 PB |
| 6,355,887 | B1 | * | 3/2002 | Gretz ............................ 174/72 A |
| 6,364,257 | B1 | * | 4/2002 | Holder ......................... 248/74.3 |
| 7,263,745 | B2 | * | 9/2007 | Mori ............................ 24/16 PB |
| 8,732,914 | B2 | * | 5/2014 | Browne et al. .............. 24/30.5 T |
| 2003/0088948 | A1 | * | 5/2003 | Cook ............................ 24/16 PB |
| 2005/0230570 | A1 | * | 10/2005 | Takeuchi ....................... 248/74.2 |
| 2006/0027278 | A1 | * | 2/2006 | Kurmis ......................... 140/123.5 |
| 2012/0266419 | A1 | * | 10/2012 | Browne et al. .............. 24/20 EE |
| 2013/0014350 | A1 | * | 1/2013 | Lie ............................... 24/16 PB |
| 2014/0082923 | A1 | * | 3/2014 | Owen ......................... 29/525.03 |
| 2014/0165339 | A1 | * | 6/2014 | Yuan ............................ 24/16 PB |
| 2014/0196257 | A1 | * | 7/2014 | Entwistle ....................... 24/16 R |
| 2014/0208547 | A1 | * | 7/2014 | Hollins ........................ 24/16 PB |

* cited by examiner

*Primary Examiner* — Essama Omgba
*Assistant Examiner* — Darrell C Ford

(57) ABSTRACT

A tie strip (1) comprising a strip of material having teeth (2) on at least one face thereof wherein along the length of the strip there is provided a plurality of apertures each covered by a flap, (3) wherein the tie strip is such that when an end thereof is passed through an aperture the flap engages with the teeth to inhibit withdrawal of the strip in the opposite direction.

1 Claim, 15 Drawing Sheets

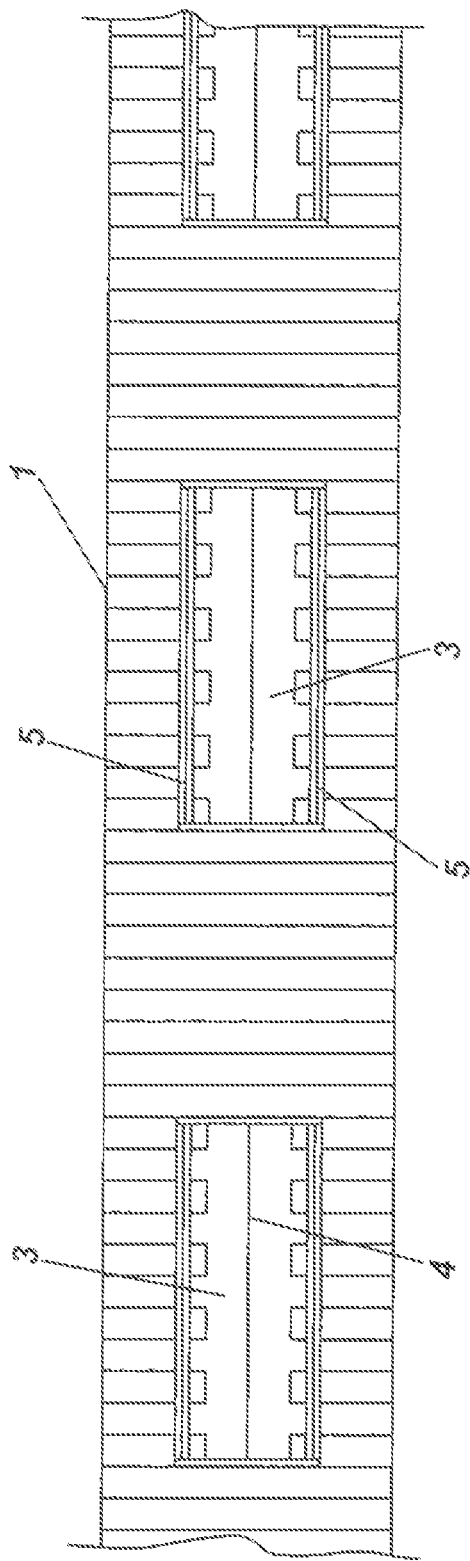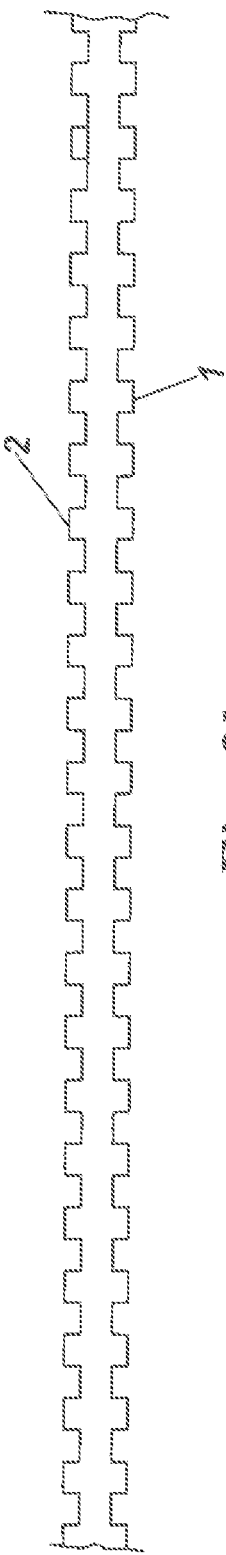

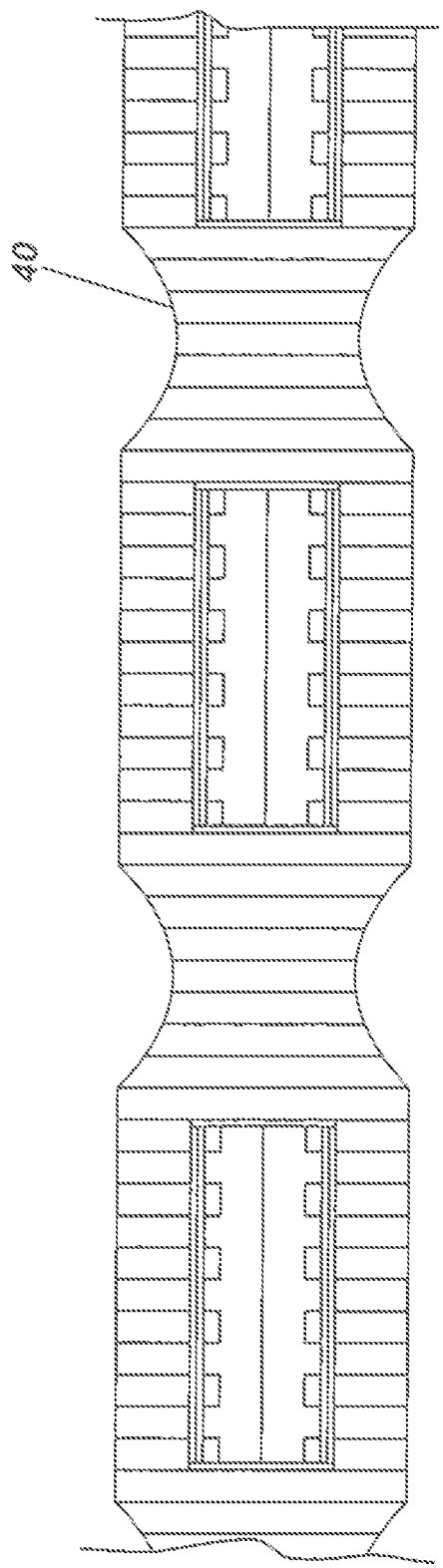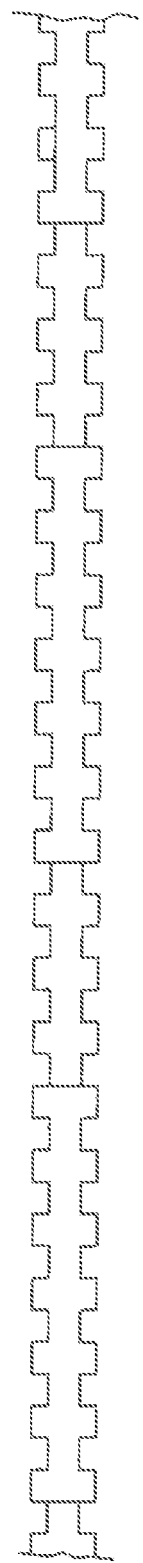
Fig. 8a
Fig. 8b

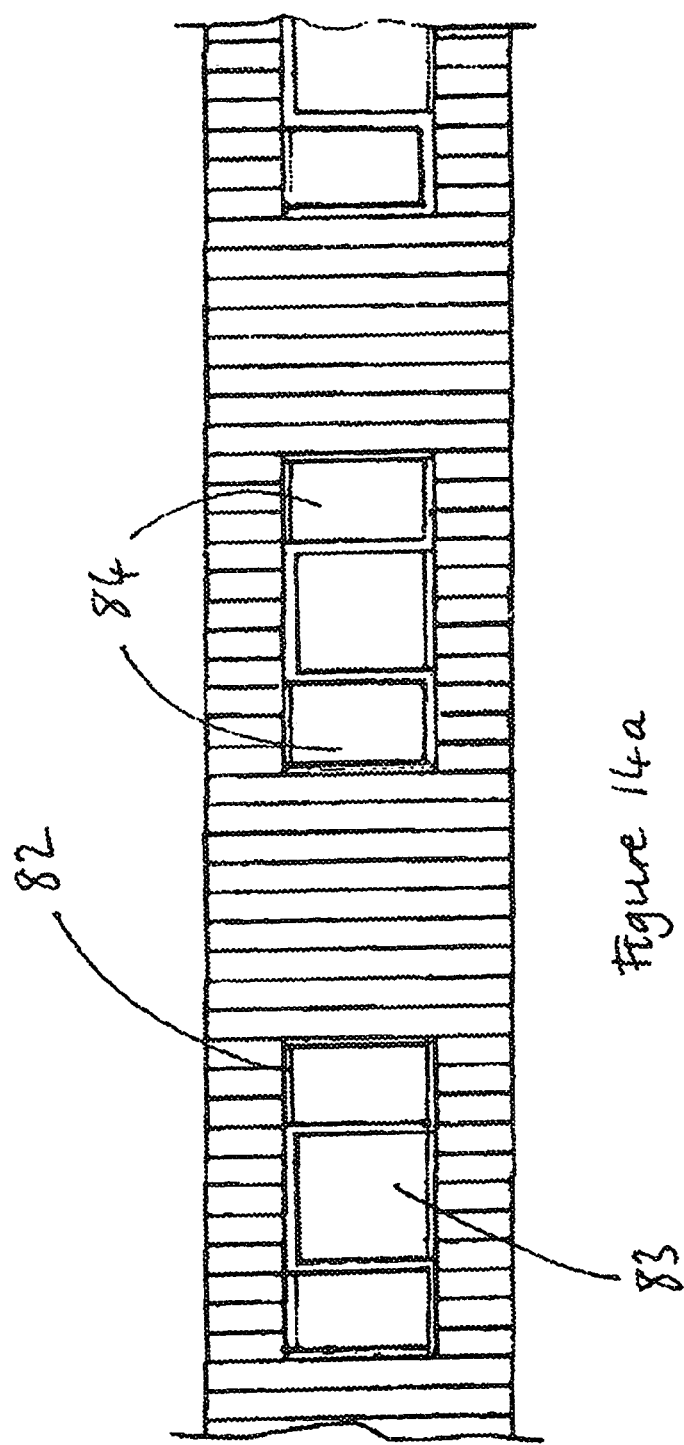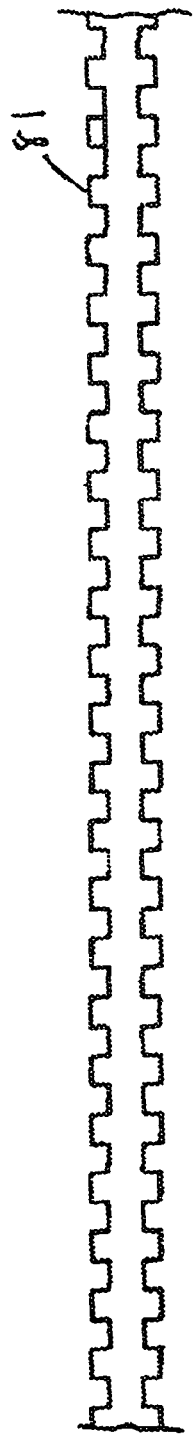
Figure 14a
Figure 14b

TIE STRIP

The present invention relates to a tie strip for securing items together. Tie strips have been known for many years and are commonly referred to as cable ties as they are often used to secure bundles of cables together.

A particularly common cable tie of the prior art is shown in FIGS. 1a and 1b and includes a strip of plastics materials having at one end a head 1 and at the other end a tapered tail portion 2. One side of the tie is provided with a series of ridges 4. The head is provided with an aperture 3 through which the tail may be inserted. The tail must be inserted in a particular direction such that the ridges along the length of the strip engage with a ratchet within the aperture of the head (not shown). The ridges interact with the ratchet such that the strip can only be pulled in one direction. Withdrawal of the tail of strip from the head in the opposite direction is very difficult.

In use the cable tie is used to secure items, for example cables together tightly and then any excess length is trimmed to provide a neat and tidy appearance.

A disadvantage of cable ties of the prior art is that they are a predetermined length. Once the tie has been used to secure items in place the portion which is cut off is thrown away and cannot be reused. In cases where a large bundle of items needs to be secured the tie may not be long enough. Thus a user will have to carry a selection of ties of differing lengths or accept large levels of waste when securing small bundles of items.

In addition when using traditional cable ties of the prior art the tail must be inserted through the head in a particular direction such that the ridges are aligned with the ratchet within the head. If the tail is inserted in one of a number of possible alternative directions then the tie does not work. This can cause difficulties if somebody is trying to use the tie in an environment where it is difficult to see or difficult to manoeuvre.

It is an aim of the present invention to provide a tie strip which overcomes at least one disadvantage of the prior art.

According to a first aspect of the present invention there is provided a tie strip comprising a strip of material having teeth on at least one face thereof wherein along the length of the strip there is provided a plurality of apertures each covered by a flap.

Each aperture may be partially or completely covered by a flap. Each aperture may be partially covered or completely covered by one or more flaps. Preferably each aperture is completely covered by one or more flaps. In some preferred embodiments each aperture is covered by two flaps. Suitably the two flaps are of substantially the same size.

Preferably the one or more flaps extend across the width of the aperture. Suitably the one or more flaps cover substantially all of the aperture.

The flap is such that it may be easily opened. When two or more flaps are present they are suitably such that they may be opened in the same direction as each other relative to the plane of the strip. Preferably each flap is such that it may be opened in either direction relative to the plane of the strip. Thus for a strip lying in a horizontal plane each flap may be such that it may open above the plane or below the plane.

The flaps suitably provide a cover for the aperture such that they may be moved from an opened to a closed position. The flaps are thus suitably flexible and can move in and out of the plane of the strip. Suitably each flap is provided with a hinge to allow it to articulate in and out of the plane of the strip. The hinge may be such that the articulation may be reversible. Alternatively once the flap is opened it may be such that it can not be reclosed. The apertures are suitably closed by means of a flap which is cut out of the material from which the strip is made. The flap may be hinged by the provision of a thinner portion of the material where the flap joins the main body of the strip around the edge of the aperture.

The one or two flaps may be regarded as functioning in the manner of a single door or double doors which open and close (preferably in either direction). In the case of two flaps, these may be regarded as "double doors" which open in the same direction, although each will rotate about its hinge in an opposite direction.

In some embodiments each aperture may be covered by more than two flaps. For example each aperture may be covered by three flaps. In such embodiments each aperture may be covered by a central flap and two side flaps. These may be arranged with hinges on the same or different sides of the aperture. For example the central flap may be hinged about one side of the aperture and the side flaps may be hinged about the other side of the aperture.

In some embodiments each aperture may be covered by more than three flaps, for example four, five or six flaps.

Preferably the strip is formed from a single piece of material into which the flaps have been cut. The flaps may be shaped so that they are thinner than the strip as a whole. They may be tapered in the region close to the hinge and or at the edge opposite the hinge. The flaps may be suitably shaped in the region of the hinge to allow ease of opening.

The strip is provided with a plurality of apertures. Suitably the apertures are elongate. Preferably each aperture is substantially rectangular in shape. Preferably the length of each aperture is substantially parallel to the length of the strip. Thus the tie strip preferably comprises a plurality of elongate apertures having a length parallel to the length of the strip.

The tie strip is provided with teeth on at least one face of the strip. In preferred embodiments both faces of the strip are provided with teeth. Hence the strip may be regarded as a ribbon of material in which the upper and lower faces are provided with a plurality of teeth. The teeth may be of any suitable shape. For example the teeth may be triangular, saw tooth, rectangular, square, irregular, sinusoidal, trapezium or any other suitable shape.

Preferably the teeth are of a regular shape. Preferably all of the teeth are of substantially the same size and shape. Preferably the teeth are evenly spaced along the length of the strip. Preferably the teeth extend across substantially the whole length of the strip. In some preferred embodiments the teeth are square or rectangular.

Preferably the teeth extend across the width of the strip.

Suitably when teeth are provided on both faces of the strip they are in alignment such that the teeth are arranged symmetrically about the plane of the strip. Thus at a given position on the strip each face will have a tooth or will be at a recess between teeth.

Preferably the teeth are symmetrical. Preferably they are symmetrical about a plane perpendicular to the length of the strip. Square and rectangular teeth are symmetrical but non-isosceles triangular teeth are not.

In preferred embodiments the flaps are formed by making cuts into the strip and thus the teeth may be provided on the flaps. Alternatively the flaps may be shaped to provide thinner regions of material such that portions of some of the teeth are shortened or removed.

Preferably the edges of the strip are parallel along the length thereof although embodiments including cut out narrower portions are also within the scope of the invention.

The strip may be made from any suitable material. For example it may be made from a plastics material, a natural or synthetic polymer or a metal. Preferably the strip is made from a thermoplastic material. In one especially preferred embodiment the strip is made from a nylon material.

In some preferred embodiments the tie strip is made from a biodegradable material, for example a biodegradable plastics material.

In some cases where a particular use of the tie strip of the invention is envisaged it may be made from a specialist material or a composite material. In some embodiments the tie strip may be formed from a plurality of laminated layers.

For example the tie strip may include a conducting layer and an insulating layer. Use of the strip to form a loop would thus allow an electric circuit to be completed.

For tie strips which are intended to be used to secure garden items the strip may be impregnated with a chemical for example a pesticide or fertiliser.

In use, an end of the strip is passed around the item which needs to be secured and then passed through an aperture. On passing through the aperture the end of the strip pushes open the flap or flaps. Passage in this direction is possible as the flaps can open wider to accommodate the teeth. However the removal of the strip by pulling back in the reverse direction is hindered as the flaps engage with the teeth to inhibit this motion. The flaps move towards each other within a space between the teeth and cannot open out again as their reverse movement is obstructed by the teeth.

Thus the tie strip of the present invention is such that when an end thereof is passed through an aperture the flap engages with the teeth to inhibit withdrawal of the strip in the opposite direction.

Preferably the strip is provided with teeth on each face of the strip and is provided with two flaps such that each of the two flaps engage with teeth on each face of the strip. In preferred embodiments in which the flaps may be opened from the plane of the strip in either direction the end of the strip can be threaded through the aperture from either face.

In some especially preferred embodiments the teeth are symmetrical. In such embodiments either end of the strip may be threaded through an aperture to provide engagement with the flaps. In most preferred embodiments the flaps may be opened from either side using either end of the strip, and in each case the teeth will engage with the flaps to inhibit withdrawal in the opposite direction.

The tie strip of the present invention may be made by any suitable means. For example it may be made by extrusion. A sheet of plastics material may be extruded from an extrusion machine. This can then be passed through two rollers which print teeth onto one or both faces of the sheet. The sheet may be cut into strips before or after the teeth are formed. The flaps may be formed by cutting before or after the sheet is cut into strips.

Alternatively a sheet of material may be embossed to provide teeth. Flaps may then be cut into the sheet and it can be divided into strips. The apertures and strips may be formed in a single cutting process.

In some embodiments the teeth and apertures may be formed in a single step process.

Other methods by which such strips could be made are well known to those skilled in the art.

The strip of the present invention may be provided as a roll of material. A particular advantage is that when the strip is to be used to secure items together any length may be cut from the roll. Unlike tie strips or the prior art it is not necessary to have to hand strips of differing lengths. Once the material has been used to secure the items in place it can be cut from the roll and all of the remainder can be used. There is no waste as with tie strips of the prior art.

The tie strip of the present invention can be used in any situation where a loop of material can be used to secure items together. For example the tie strip may be used to secure cables or other such items together. The tie strip of the present invention could also be used to secure an item to a horizontal or vertical support provided that it can be looped around an anchor point on the support.

The tie strip could be used to form one or more additional loops with existing loops in order to add further items to an existing bundle.

The tie strip of the invention may be useful in gardening applications to secure one part of a plant to another or to secure a plant to a support for example a fence or netting. In some such gardening applications it is desirable that the tie strip is non-toxic and biodegradable.

In some embodiments the tie strips of the present invention could be used in security applications. For example a strip may be provided which has a conducting core for example of metal and an outer insulating casing for example of plastic. The strip may be threaded through high cost items (for example electrical goods) on display in a retail outlet. If the strip is cut there will be a break in the circuit and an alarm will sound.

In some embodiments the tie strip of the present invention may be used to secure labels to an item, for example for display purposes or to identify a particular species of plant.

The present invention may further provide a tie strip which carries a display panel. The display panel may be moulded or cut from the same piece of material as the tie strip and thus be integral therewith. The display panel may be used to carry a label of any type. As the display panel is directly attached to a portion of tie strip the strip may be wrapped around an item to provide labeling. Alternatively it may be inserted into the aperture of another portion of strip which is already in position in order to provide a label at this location. In some embodiments a portion of the strip carrying a label may be inserted into a board comprising a plurality of apertures.

The present invention further provides a board of material to which items may be attached. Such a support board suitably comprises a sheet of material comprising a plurality of apertures each covered by a flap. Unlike the tie strips of the present invention the board has not been cut into strips and it does not need teeth. However the apertures are suitably of the same type as those used with the strip. Tie strips of the present invention could be threaded through one or more, suitably two apertures in the support board such that the flaps covering the apertures on the board engage with teeth of the strip thus securing the strips to the board. Thus loops formed from the tie trip may suitably be attached to the board.

The board may suitably be mounted on a vertical or horizontal support, for example a wall or ceiling and can be used to secure objects thereto. For example a board may be mounted on the wall of a garden shed and loops formed from the strips extending from the board such that tools may be stored within the loops.

According to a second aspect of the present invention there is provided a method of securing two or more items together using a tie strip of the first aspect, the method comprising:

(a) positioning the strip around the items to be secured;
(b) inserting an end of the strip through an aperture thereof;
(c) pulling the strip around the items as tightly as desired; and
(d) optionally cutting away excess strip.

According to a third aspect of the present invention there is provided the use of a tie strip of the first aspect to secure two or more items together.

Preferred aspects of the second and third aspects are as defined in relation to the first aspect.

Non-limiting examples of invention will now be further described with reference to the accompanying drawings in which:

FIG. 2a shows a top view of a tie strip in accordance with the present invention;

FIG. 2b shows a side view of the tie strip of FIG. 2a;

FIGS. 8a and 8b show an alternative tie strip of the present invention;

FIG. 14a shows a top view of a further embodiment of a tie strip of the present invention;

FIG. 14b shows a side view of the tie strip of FIG. 14a; and

Figure 1A:
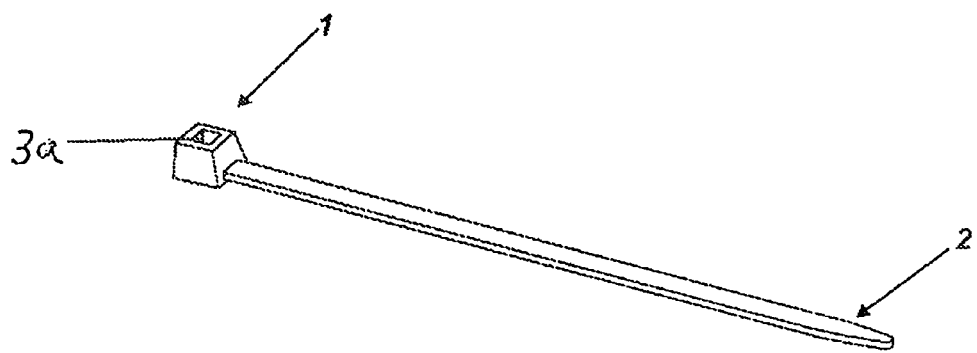
FIG. 1a shows a perspective view of a prior art tie strip.
Figure 1B:
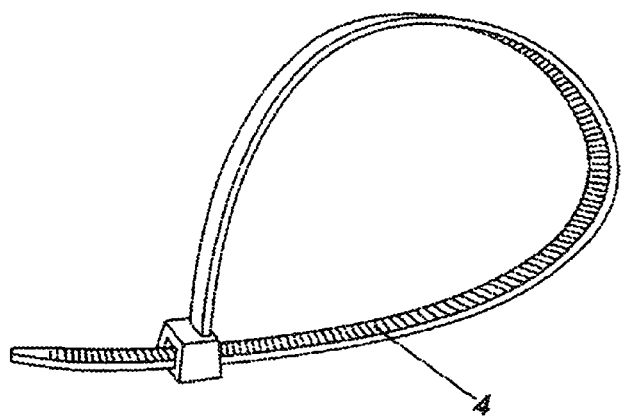
FIG. 1b shows a perspective view of the tie strip FIG. 1a in a configuration such that ridges 4 are engaged.

FIG. 2a shows a plan view from above of a length of tie strip 1 formed from a plastics material, for example nylon. A side view of the strip is shown in FIG. 2b. As can be seen in FIG. 2b the upper and lower faces of the tie strip are each provided with a plurality of rectangular teeth 2. Along the length of the strip there are a plurality of apertures which, as can be seen from above in FIG. 2a, are each covered by a pair of flaps 3. The flaps join at a central slit 4 and may articulate about a hinge 5 on the side of each flap in a direction in or out of the plane of the paper.

Figure 3:
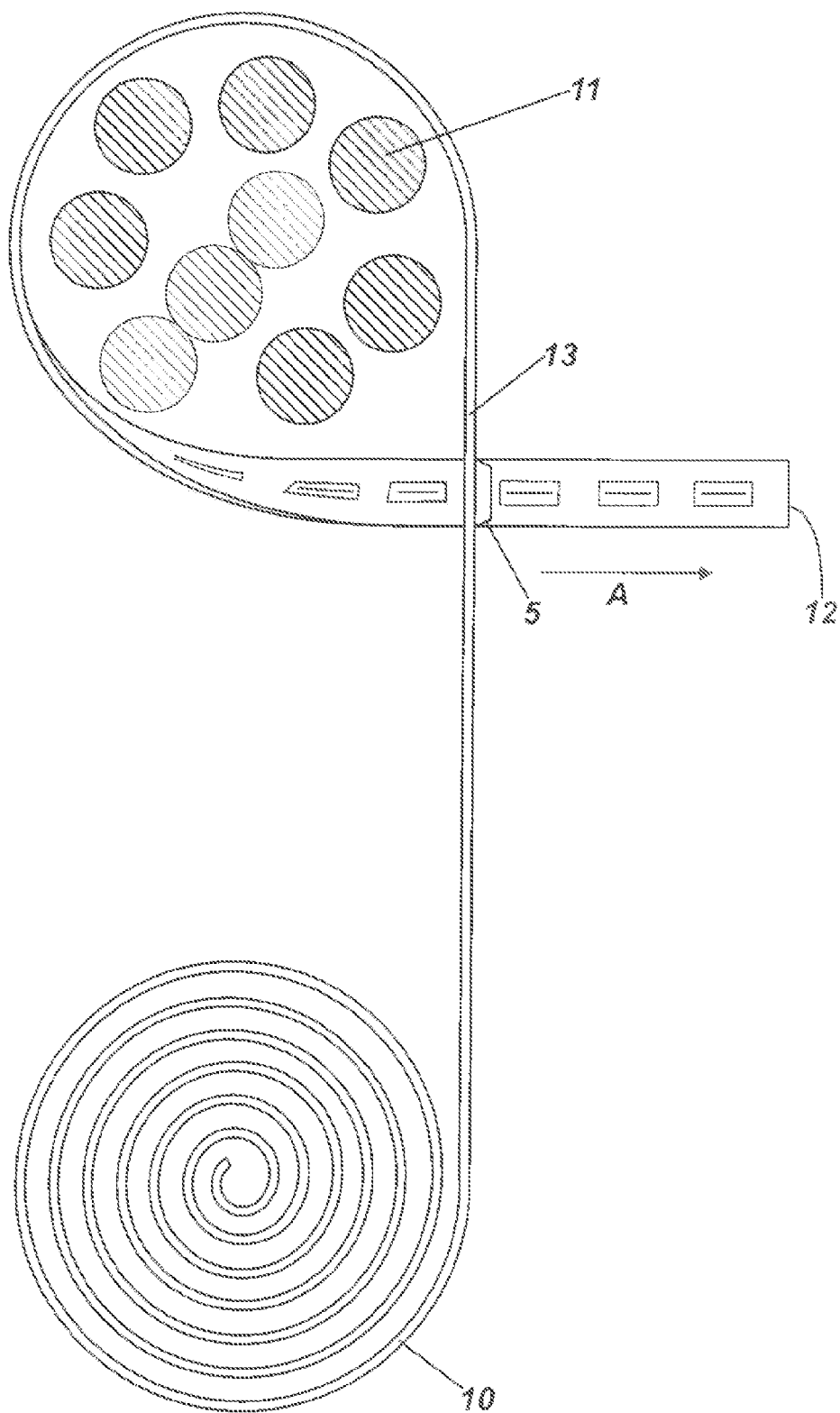
FIG. 3 is a schematic view of a roll of the strip of FIGS. 2a and 2b in use to secure a plurality of cables.

The tie strip is typically provided in a long roll for example of from 30 to 200 cm although shorter or longer lengths may be provided. Such a roll of material 10 is shown in FIG. 3. In FIG. 3 it can be clearly seen that the end of the strip 12 has been passed around a bundle of cables 11. The end of the strip 12 has then been inserted through an aperture in what is shown as vertical portion 13 in the direction indicated by arrow A. The end of the strip has pushed open flaps 3 and these will engage with the teeth (not shown in FIG. 3). The end of the strip 12 may be continued to be pulled in the direction indicated by arrow A until it is tightly secured around the bundle of cables 11. However withdrawal of the strip in the opposite direction will be inhibited due to engagement of the flaps with the teeth.

Figure 4:
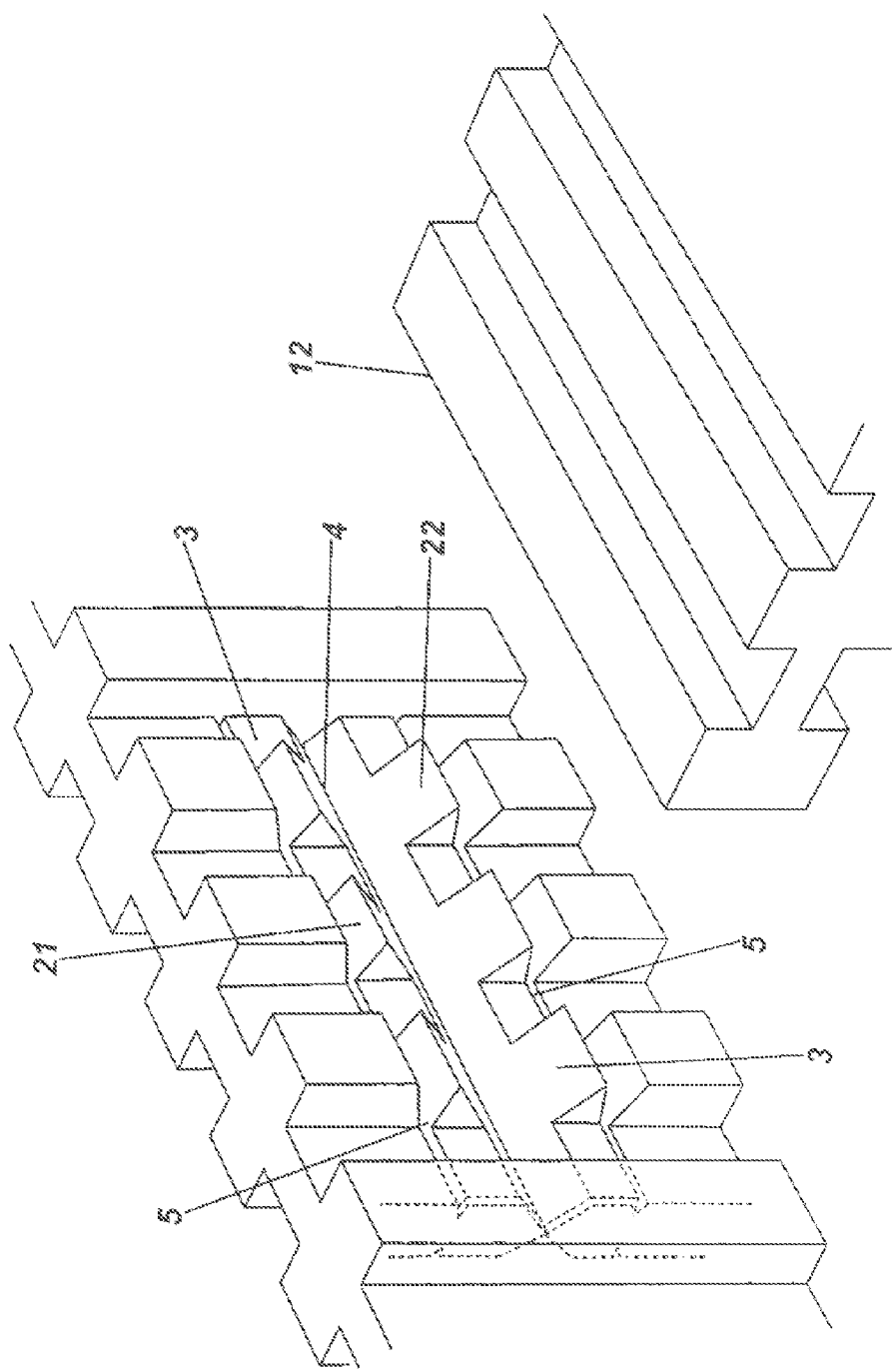
FIG. 4 shows the end of the tie strip of FIGS. 2a and 2b positioned to pass through an aperture within said tie strip.

An enlarged view of the end of the strip 12 as it is inserted into the aperture is shown in FIG. 4. FIG. 4 shows that flaps 3 are connected to the main body of the strips by hinged portions 5 and meet at central slit 4. It can be seen that part of the teeth have been cut away at 21 in the region of the flap 3 near the hinge 5 and also on the other side of each flap at 22 where the two flaps join to form slit 4. This ensures that the end of the strip 12 is able to easily push open the flap.

Figure 5:
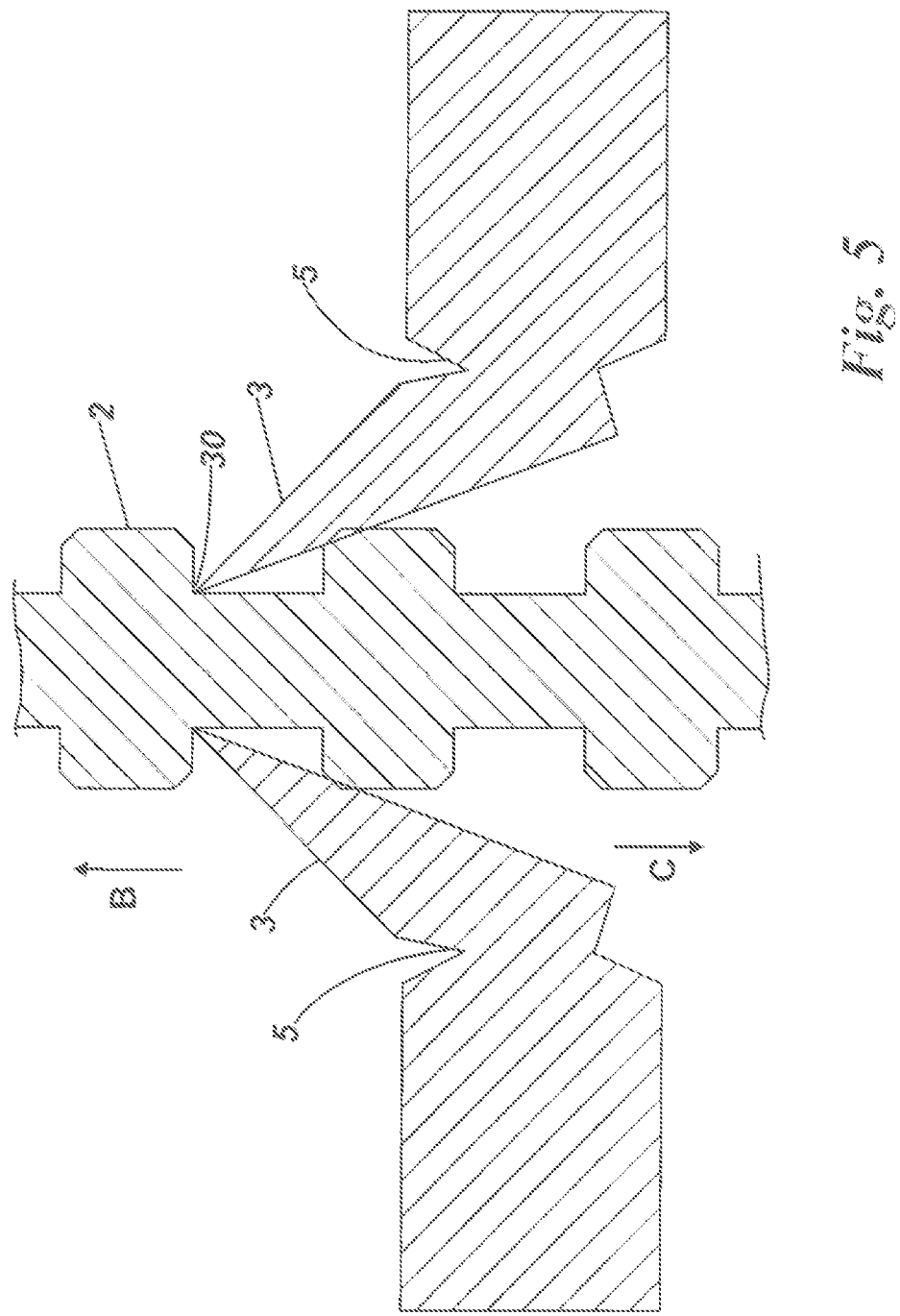
FIG. 5 shows a cross-sectional view of the interaction of the tie strip of FIGS. 2a and 2b within an aperture thereof.

FIG. 5 is a cross sectional view of teeth engaged with a pair of flaps. It can be seen that the strip has been pulled through in the direction indicated by arrow B. This is possible because the flap 3 articulates about the hinges 5. However removal of the strip in the opposite direction i.e. the direction indicated by arrow C is inhibited due to the engagement of the teeth with the flaps at the position indicated 30. The flaps cannot close because the strip is held therebetween thus removal of the strip is inhibited.

Figure 6A:
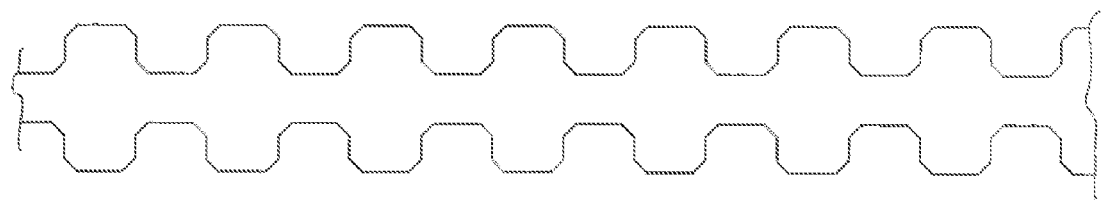
FIGS. 6a, 6b and 6c show an alternative tie strip of the present invention.
Figure 6B:
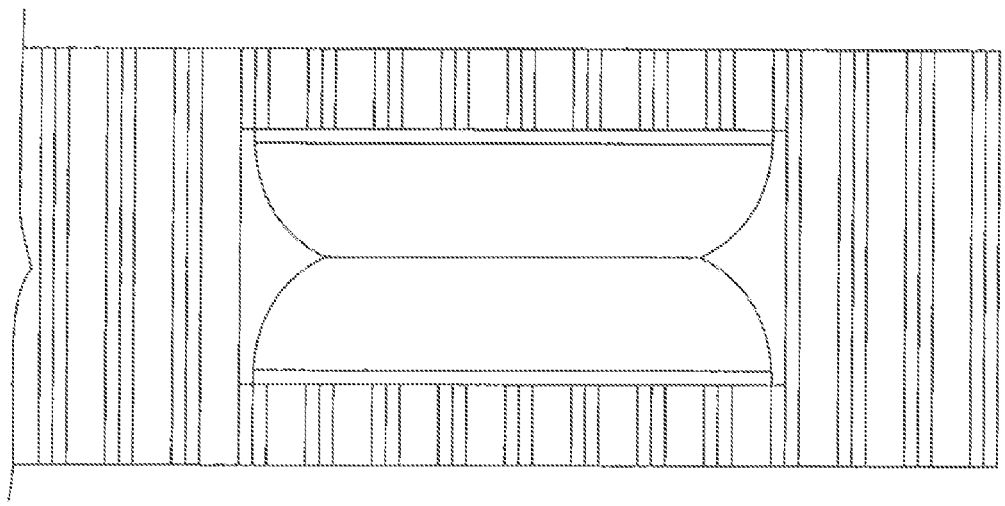
Figure 6C:

The embodiments shown in FIGS. 6a, 6b and 6c includes teeth having a slightly rounded shape and the flaps have been shaped with a cut-out portion at either end.

Figure 7A:
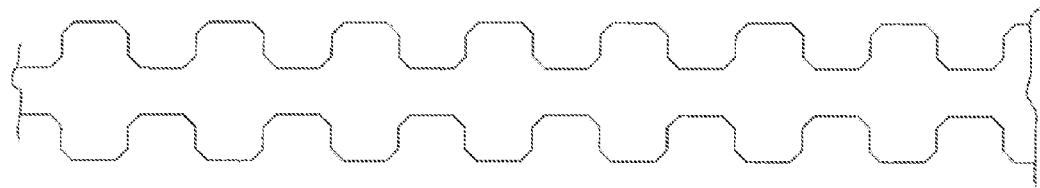
FIGS. 7a, 7b and 7c show an alternative tie strip of the present invention.
Figure 7B:
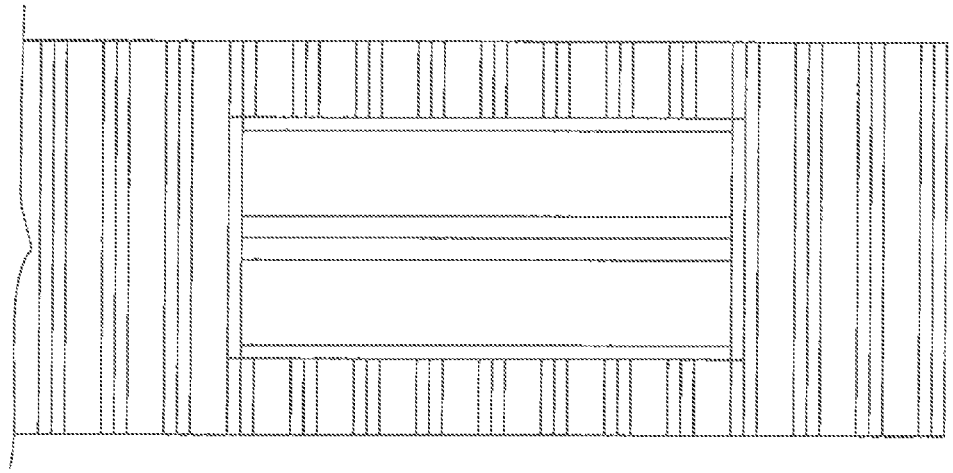
Figure 7C:
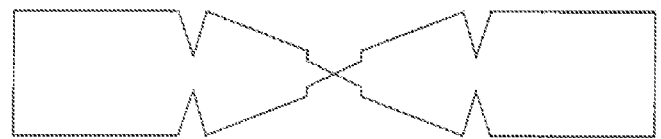

In the embodiment shown in FIGS. 7a, 7b and 7c the flap has been cut to provide a thinner region in the centre. This will allow better engagement with the teeth. In addition the use of less material may lead to a reduction in costs.

In the embodiment shown in FIGS. 8a and 8b sections of the strip where there are no apertures have been cut out to provide narrower sections 40. If a length of tie strip is cut in such a section the resulting end of the strip will have a narrow portion which will permit easier insertion into an aperture during subsequent use.

Figure 9:
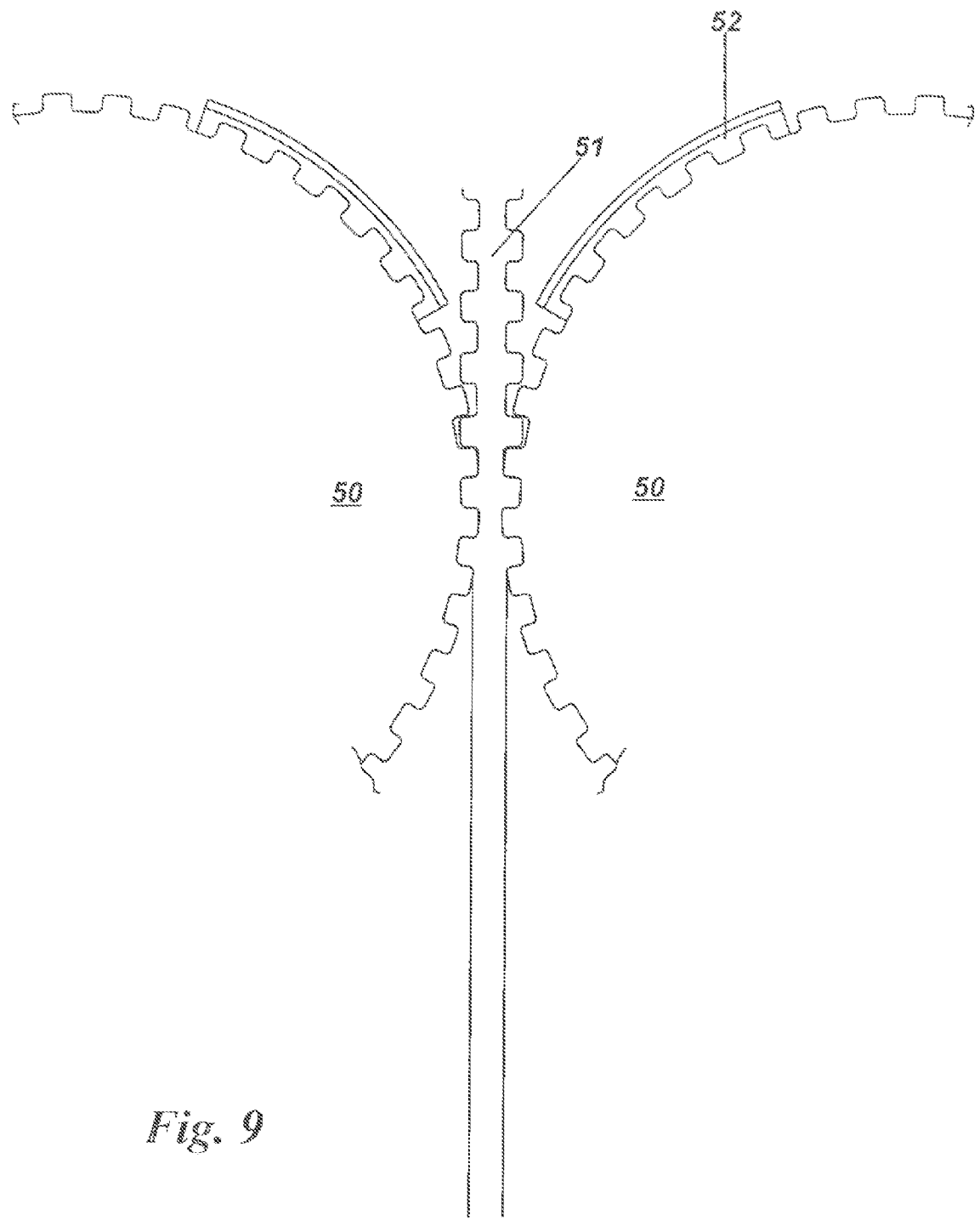
FIG. 9 shows a strip of extruded material being shaped to form a tie strip of the present invention.
Figure 10:
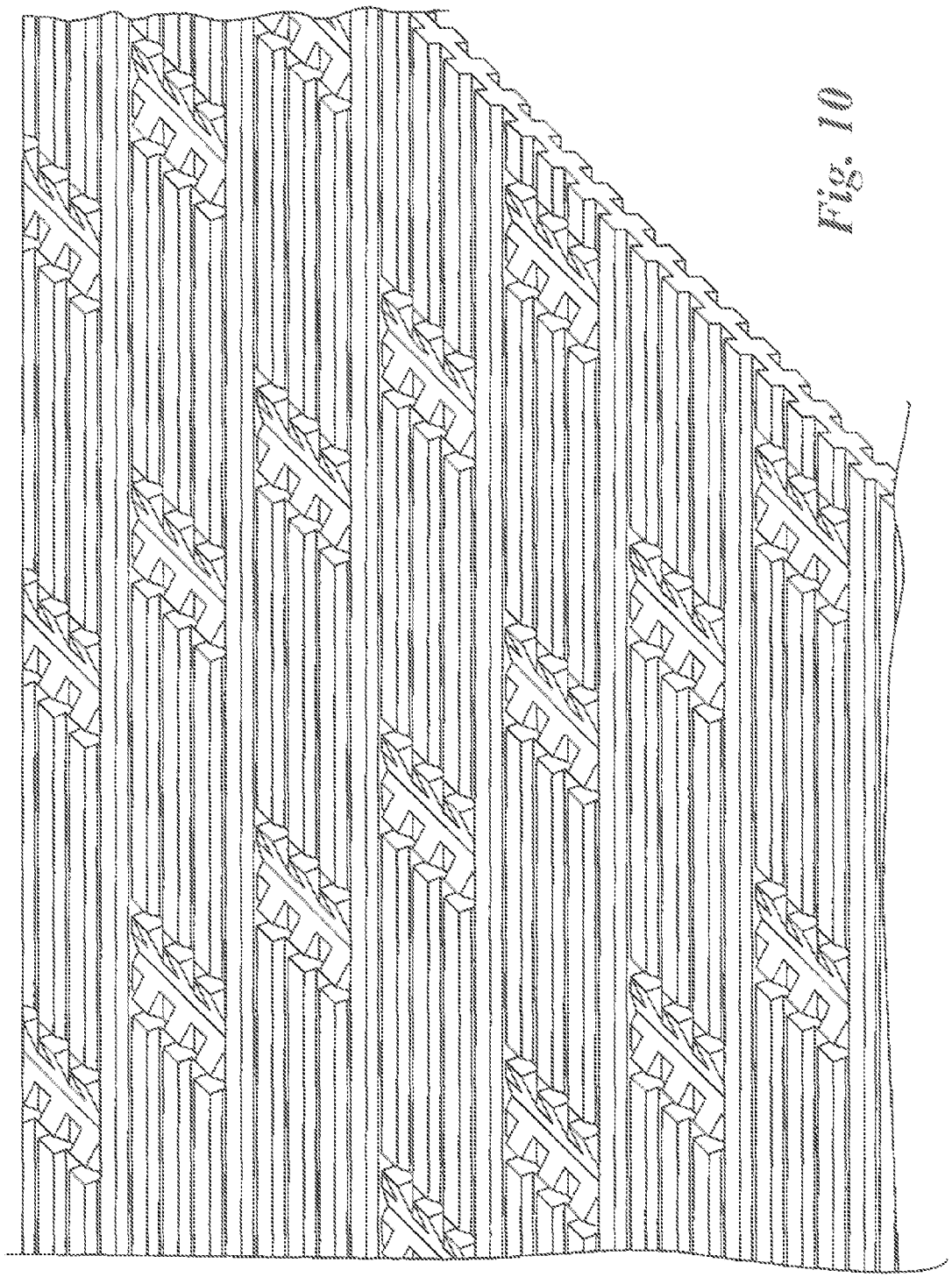
FIG. 10 shows a sheet of material which maybe cut to form tie strips of the present invention.

The strips may be made by any suitable means as is described above. However in one embodiment a strip or sheet of material 51 is passed through a pair of rollers 50 as shown in FIG. 9. In the case of a thermoplastic material this may suitably be carried out shortly after the strip has been extruded and preferably while it is still warm. The rollers shape the material to provide teeth on each face. In addition the rollers shown in FIG. 9 carry cutting blades 52 which cut apertures into the strip or sheet of the material at regular intervals. A sheet of material such as is shown in FIG. 10 may be thus provided. Such a sheet can then be cut into strips to provide the tie strip of the present invention.

Alternatively the sheet shown in FIG. 10 could be used as a support board. The sheet could be mounted on a wall or ceiling and tie strips of the invention could be inserted into the apertures of the sheet to provide loops. These loops could be used to secure items to the support board. Alternatively a plurality of strips carrying display panels could be inserted into apertures within the support board.

Figure 11:
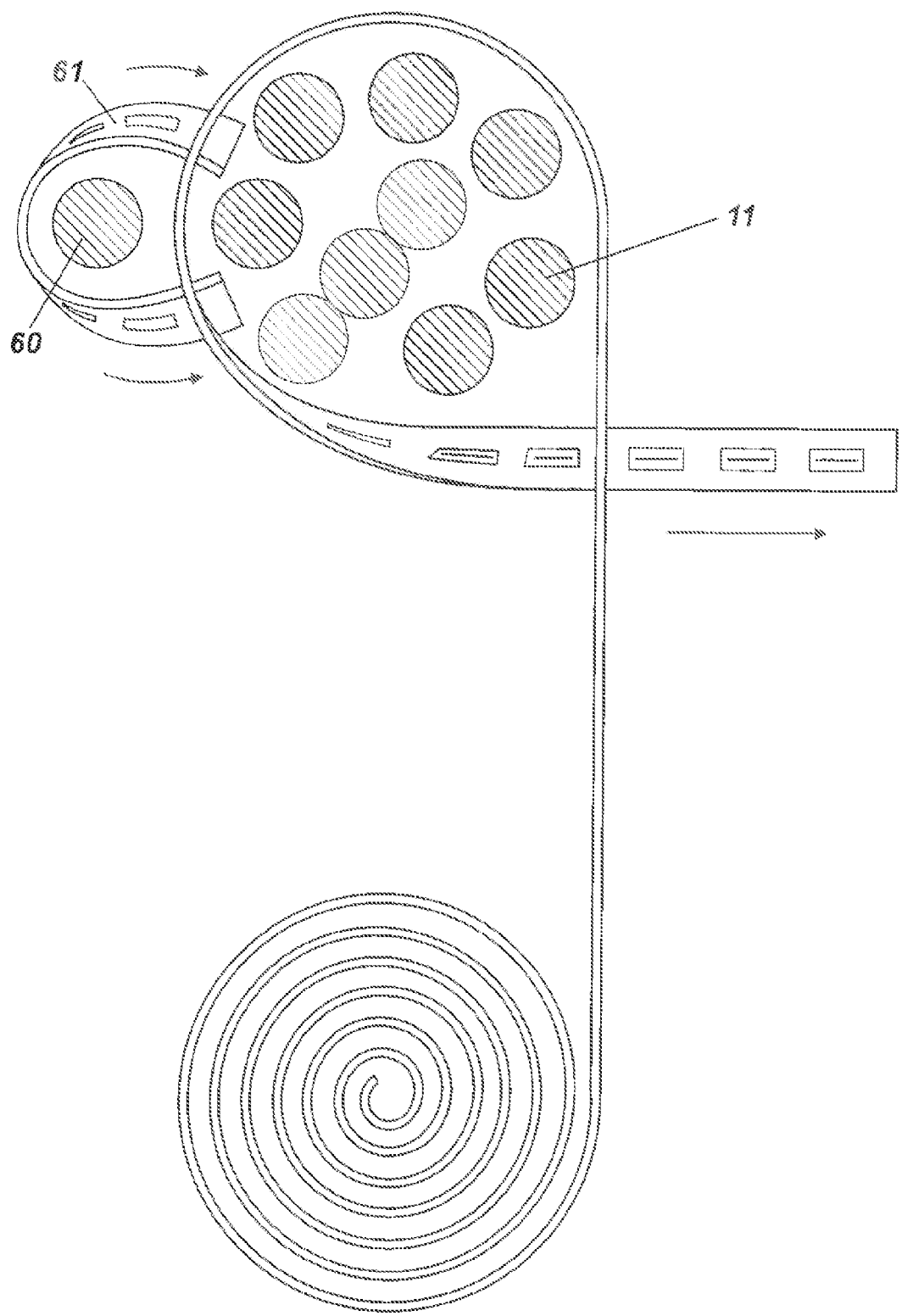
FIG. 11 shows the strip of FIG. 3 in which an additional loop has been added.

FIG. 11 illustrates how a further cable 60 could be added to cables 11 secured as described in relation to FIG. 3. An additional short length of tie strip 61 has been used to form another loop by engagement with apertures in the strip of the main loop such that the additional cable 60 may be secured.

Figure 12:
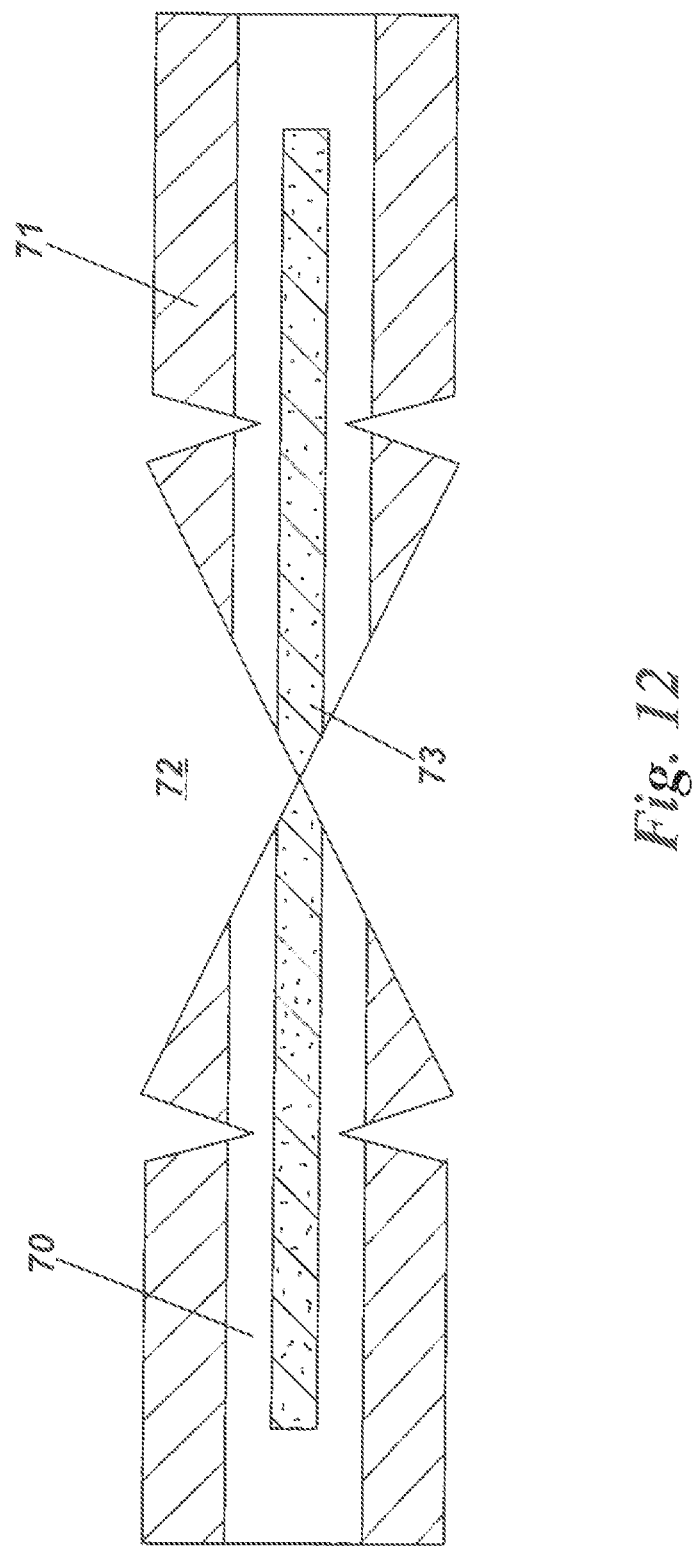
FIG. 12 shows a cross-sectional view widthways through an aperture of a strip which could be used in security applications.
Figure 13:
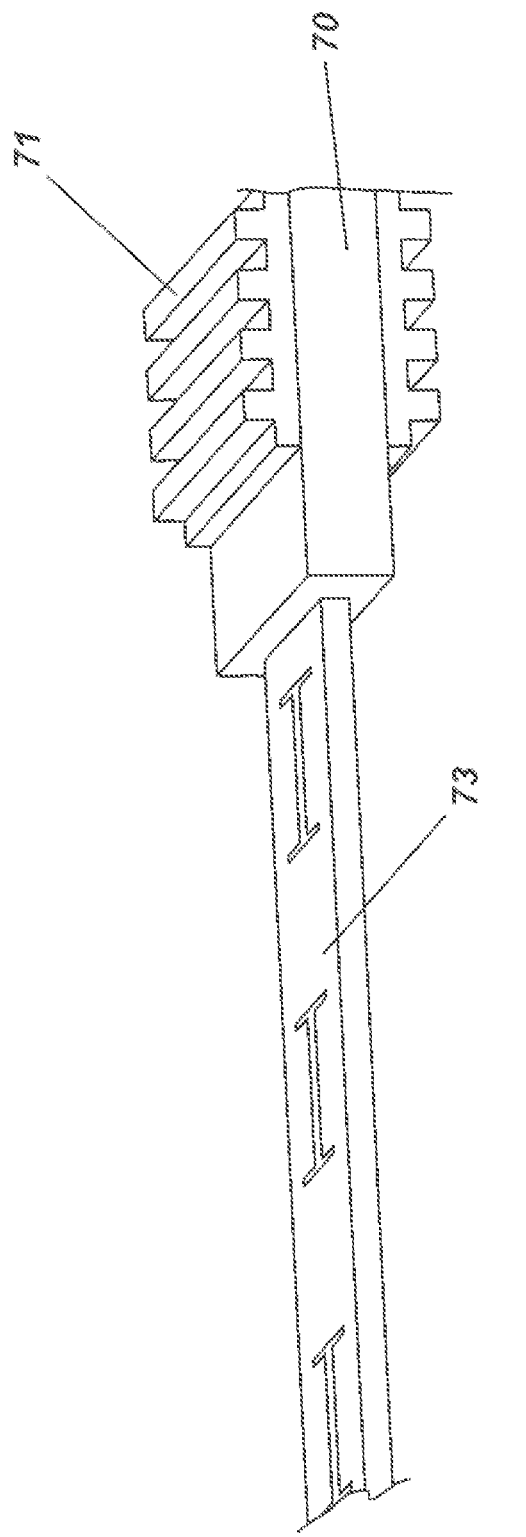
FIG. 13 shows a perspective view of the strip of FIG. 12 in which successive layers have been cut away.

FIGS. 12 and 13 show a tie strip of the present invention comprising an inner core 73 of a conducting material for example copper. This is surrounded by an insulating element 70, for example of a plastics material and the teeth 71 are made of a conducting material. Thus when an end of the strip is inserted into an aperture a loop is completed to form an electrical circuit. There is a piece of insulating material 73 running across each flap so that in an unused strip there is no continuous electrical contact. When an end of the strip is inserted into aperture 72, the conducting elements will make contact to complete a circuit. Such a strip could be used in security applications. For example if the strip is cut and thus the electric circuit is broken, an alarm may sound.

Figure 15:
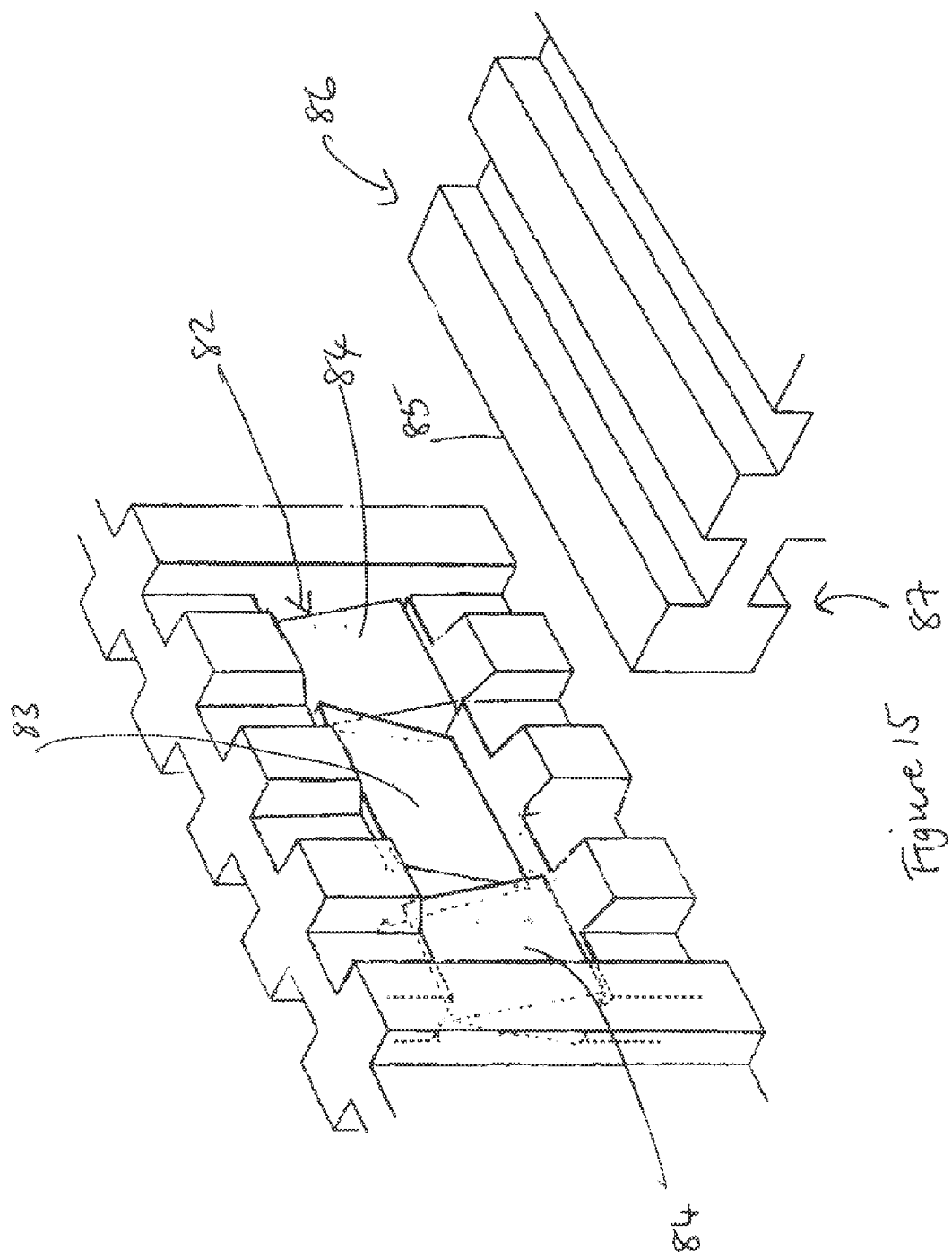
FIG. 15 shows the end of the tie strip of FIGS. 14a and 14b positioned to pass through an aperture within said tie strip.

FIGS. 14a, 14b and 15 show a tie strip of the present invention having a similar structure to the embodiment shown in FIGS. 2a and 2b: it comprises a strip of plastics material, the upper and lower faces of which are provided with a plurality of rectangular teeth 81; and which comprises a plurality of apertures 82 along the length thereof. However in this embodiment each aperture is covered by three flaps—a central flap 83 and two side flaps 84. As can be seen from FIG. 15, when the end 85 of the strip is pushed into the aperture 82, the central flap 83 will engage with the teeth of the upper face as shown 86 and the side flaps 84 will engage with the teeth of the lower face as shown 87.

The invention claimed is:

1. A tie strip comprising:
a strip of material having a width and a thickness, the thickness less than the width, the strip having teeth extending across the width of the strip, on at least one face thereof, the strip having an insertion end, the strip defined by a longitudinal axis which bisects the at least one face,
the strip comprising a plurality of apertures, each of the plurality of apertures having an aperture width at least as wide as the width, the aperture width of each of the plurality of apertures being oriented along the longitudinal axis, each of the plurality of apertures covered by at least one flap, configured such that when the insertion end of the strip is positioned through one of the plurality of apertures the corresponding at least one flap engages with one or more of the teeth to inhibit withdrawal of the strip and the width of the strip at the insertion end is parallel to the aperture width of said one of the plurality of apertures.

\* \* \* \* \*